Feb. 19, 1963  T. A. BANK  3,078,086
AIR SPRING BELLOWS
Original Filed Dec. 6, 1956
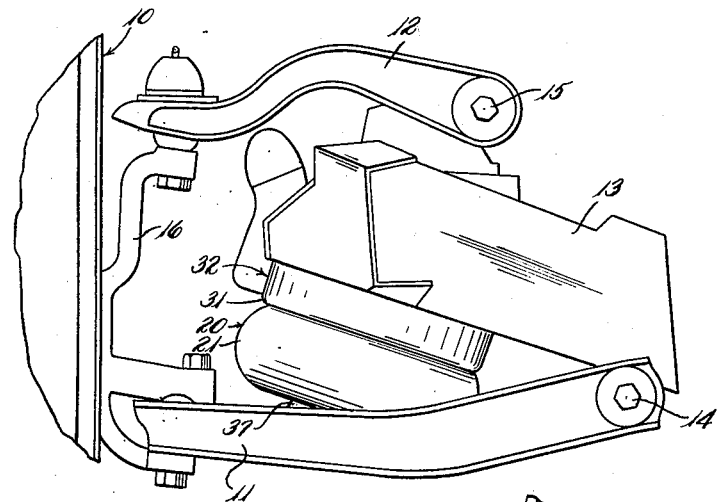
FIG. 1
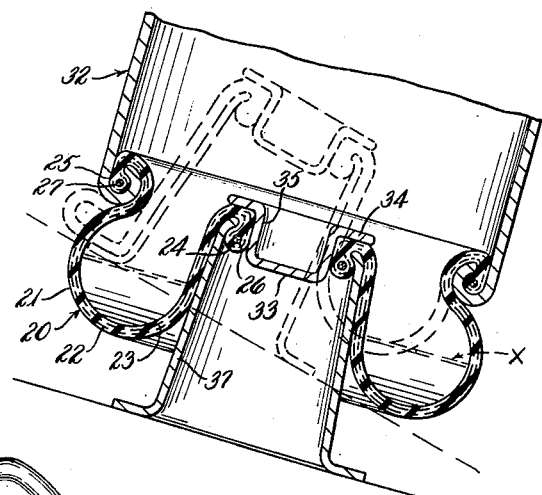
FIG. 2
FIG. 3
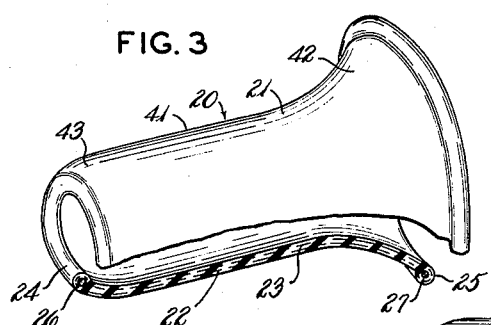
FIG. 4
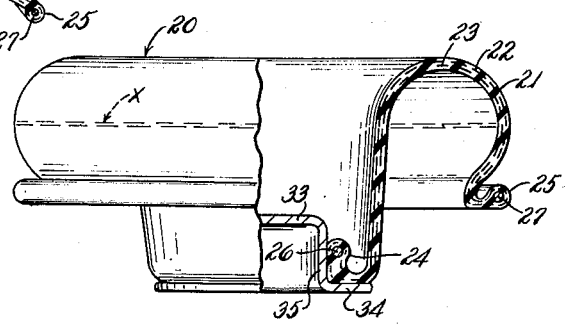

3,078,086
AIR SPRING BELLOWS
Thomas A. Bank, Indianapolis, Ind., assignor to The Firestone Tire & Rubber Company, Akron, Ohio, a corporation of Ohio
Original application Dec. 6, 1956, Ser. No. 626,678, now Patent No. 2,959,817, dated Nov. 15, 1960. Divided and this application Jan. 20, 1960, Ser. No. 5,332
1 Claim. (Cl. 267—65)

This invention relates to resilient bellows known as air springs and more particularly to an improved air spring for use in vehicle suspensions. This application is a division of Serial No. 626,678, filed December 6, 1956, now Patent No. 2,959,817.

A number of modern vehicle suspensions employ pneumatic bellows known as air springs to cushion road shocks. Such air springs contain air under pressure and they take up the wheel shocks in a manner which depends upon the changing effective area of the air springs and the changing air pressure within the air springs as they deflect.

A particularly effective air spring for vehicle suspensions takes the form of a single convolution bellows terminating at one end in a relatively large open bead and at the other end in an end structure which is capable of passing through the large bead in a telescoping movement when the air spring is compressed.

Such an air spring in neutral or mid-position will have its single convolution wall bulging outwardly to a considerably greater diameter than the diameter of the large bead. But as the air spring compresses to take up severe road shocks the convolution will be forced inwardly and up through the large open bead of the air spring. The material making up the major portion of the convolution wall is thus pulled from a diameter considerably larger than the large bead to a diameter which is considerably smaller; and as a result of this decrease in diameter, circumferential compression forces are set up in the convolution wall. Since the wall is of flexible material, it will react to these compression forces by wrinkling and folding in a longitudinal direction. As the air spring flexes repeatedly in service the wrinkles and folds resulting from the telescoping movement will often result in cracking and premature failure of the bellows. If the wrinkling is severe, the life of the air spring may be so short as to render it unfit for commercial use.

The present invention solves this problem of wrinkling by molding an air spring in such a manner as to place the convolution wall of the air spring under circumferential tension throughout most of the working stroke of the air spring. The tension which is thus induced has been found to be sufficiently great to effectively neutralize the circumferential compression forces which would otherwise be set up in the air spring. With the present invention, the telescoping movement of the air spring in most cases merely results in a lessening of the tension in the air spring wall. It is only in the most severe deflections of the air spring that the tension is overcome, and even in such cases the compressive force will be limited to values below those which would cause wrinkling of the wall of the air spring.

Specifically, this result is achieved by molding the air spring with the small end of the air spring extending through the large open bead so that the air spring in the as-molded condition is either fully or almost fully telescoped. During the molding operation the cords will assume a position which is stress-free, at least so far as circumferential stresses are concerned; and the rubber surrounding the cords will flow and likewise become stress-free. That portion of the convolution wall which undergoes the radical changes in diameter during the working stroke of the air spring will thus be molded stress-free in very nearly the smallest diameter that it will assume in service. Since the changes that it will undergo in service will, in almost all cases, be toward larger diameters, these changes will place it in circumferential tension rather than in circumferential compression.

This concept of molding is utterly different from that which has been heretofore practiced in the art. The conventional method is to mold an air spring in about its neutral or mid-position. With the use of this new molding technique the service life of such air springs has been materially extended. Surprisingly such an air spring also provides better ride characteristics than one molded in the usual manner. With such air springs, natural frequencies as low as 35 to 40 cycles per minute have been obtained whereas in the prior air springs of corresponding design the lowest frequencies are in the order of 50 cycles per minute.

A general object of the invention therefore is to provide an air spring which has little or no tendency to wrinkle when the air spring is compressed.

Another object is to provide an air spring having a long service life.

Another object is to provide an air spring having an inherently low natural frequency.

Another object is to provide an air spring whose convolution wall will be under substantial circumferential tension throughout a large portion of the telescoping stroke of the air spring.

Another object is to provide an air spring which in the as-molded condition of the air spring has one end telescoped through the open bead of the other end for an appreciable distance.

Further objects and advantages will be more fully apparent from the following description of the invention, reference being had to the accompanying drawings in which:

FIGURE 1 is a front elevation of an air spring embodying the invention assembled in an automobile front wheel suspension.

FIGURE 2 is a longitudinal sectional view on a somewhat larger scale than FIGURE 1 showing the air spring of FIGURE 1 in its as-molded condition.

FIGURE 3 is a longitudinal section view of an unvulcanized air spring just after it is removed from a building drum and prior to the molding operation which produces the air spring of FIGURE 2.

FIGURE 4 is a longitudinal sectional view of an air spring in the as-molded condition.

While the invention will be described with reference to an air spring which is most useful in an automobile wheel suspension, the invention has equal advantages for air springs which are used in other vehicle suspensions such as for trucks, buses and off-the-road vehicles, as well as railroad suspensions and shock mountings of all sorts. It is not intended that the invention shall be limited to the particular type of air spring nor to the specific wheel suspension described. So long as an air spring undergoes a telescoping deflection when it is compressed, it will be advantageous to use the apparatus and method of molding described herein.

Now referring to the drawings, a typical wheel suspension for the right front wheel 10 of an automobile, as shown in FIGURE 1, comprises a pair of arms 11 and 12 which are suspended from the frame 13 of the automobile at pivot points 14 and 15, respectively. The wheel 10 is journalled on a spindle (not shown) which is supported by a member, indicated generally at 16, which in turn is secured to the outer ends of arms 11 and 12. This suspension so far as it has been described is conventional and need not be described in further detail.

When the wheel 10 encounters a bump in the road, it will move upward and inward in an arcuate path indicated approximately by the dot-dash line in FIGURE 1, this movement being permitted by the pivoting of the arms 11 and 12 about their pivot points, with arm 11 moving upward toward the frame 13. This movement of the wheel is cushioned by a single convolution air spring, embodying the present invention, which is indicated generally at 20 and which is positioned between the lower arm 11 and the frame 13 of the automobile.

The air spring 20 will usually contain air under operating pressures of about 50–150 pounds per square inch and it is designed to take a neutral position as shown in the solid lines of FIGURES 1 and 2. If the front wheel encounters a pronounced bump on the road the air spring will become compressed and the lower bead 24 will be forced upwardly through the larger bead 25 to take a position such as that shown in dotted lines in FIGURE 2. As the air spring goes from the solid line position to the dotted line position of FIGURE 2, the effective area of the air spring decreases and at the same time the air pressure within the air spring increases in such a manner as to provide a desirable spring rate.

Such an air spring 20 preferably comprises a body 21 of two plies, 22 and 23, of rubberized fabric, the fabric being essentially weftless and having cords which extend at an angle of about 15° to the axis of the air spring with the cords of one ply crossing the cords of the other. The interior of the bellows has an air-retaining lining of rubber, preferably neoprene because of its oil resistant properties. The ends of the plies 22 and 23 are wrapped about and anchored to a pair of circular steel wire cores 24 and 25 to form beads 24 and 25, respectively.

Preferably, the top bead 25 has a shape in cross-section such as that shown in FIGURE 2, similar to the bead of a pneumatic tire, which can be positioned in place on a radial flange 31 of the structure 32 which secures the air spring to the frame 13 of the automobile. This manner of mounting bead 25 is analogous to the manner in which a tire is mounted on a conventional drop center automotive rim. The bottom bead 24 is mounted so that it will move with the arm 11 and the wheel 10, and this is accomplished by an arrangement consisting of a metal cup 33, having a radial flange 34 and a sidewall 35 which are vulcanized to the end face and inside diameter of bead 24, and a tubular stud member 37 which is fixed to arm 11 and which snaps around the small bead 24 to clamp it against the cup 33 as shown in FIGURE 2. The member 37 and air spring 20 are retained in assembled position by the inflation pressure within the air spring and by the normal forces of operation.

To permit the telescoping movement of the air spring, bead 25 has an inside diameter of 5 inches while bead 24 has an outside diameter of 3 inches, a difference which provides sufficient clearance for the bead 24 to pass readily through the large bead, even when bead 24 moves through an arcuate path as indicated in FIGURES 1 and 2. Obviously structure 32 has sufficient depth to allow the lower bead 24 to enter the structure in the compression portion of the working stroke and to take the position shown by the dotted lines in FIGURE 2.

The air spring 20 is manufactured by assembling its components on a building drum by methods similar to those used in building conventional air springs, the only differences being those made necessary by the different diameters of beads 24 and 25. The air spring, as it is removed from the building drum, is somewhat bellshaped in form, see FIGURE 3, having a substantially cylindrical portion 41 which merges at one end with a concavely flaring portion 42 terminating in the large bead 25 and which merges at the other end in a contracted portion 43 terminating in the small bead 24.

The advantages of vulcanizing the air spring 20 with a major portion of its fabric body in the form of a cylinder extending in telescopic fashion through the open bead 25 can be best appreciated by considering what happens to an annular element $x$ adjacent the greatest bulge of the convolution when the air spring is compressed.

When the air spring is mounted in an automobile suspension, as shown in FIGURES 1 and 2 and when the air spring is in neutral or mid-position the element $x$ may have a diameter of say 5½–6 inches. Now as the air spring is compressed in service element $x$ will decrease to a diameter of about 4 inches for an intermediate position of the air spring, and finally element $x$ will take its smallest diameter of 2¾ inches for the extreme compressed position of the air spring.

The diameter of element $x$ thus decreases from mid-position to compressed position by amounts up to 100%, and as a result, circumferential compressive forces tend to be set up in element $x$ and corresponding forces will be set up in every other annular element of the air spring that undergoes similar changes in diameter.

In an air spring molded in the conventional manner these compressive forces may exceed the counteracting force of the internal air pressure, and if they do, wrinkles will form in the wall of the air spring each time the air spring is compressed and premature failure of the air spring will result after it has undergone only a relatively few compression cycles.

The present invention overcomes this difficulty by molding the air spring so that the air spring wall is normally under tension for practically all positions of the air spring. Thus with the air spring molded in the telescope shape just described, element $x$ will have a normal diameter of say 3 inches and the element $x$ in this position will be unstressed because it will have been relieved of stresses during vulcanization. Whenever the air spring returns to its molded diameter it will be essentially stress free, except for the effect of internal air pressure which will cause it to be under some circumferential tension. The result is that the body of the air spring when shaped and vulcanized in this fashion is under circumferential tension for almost all positions of deflection. The tension in element $x$ will be at a maximum for the neutral or midposition of the bellows and will decrease to a minimum for fully compressed positions of the air spring. By thus controlling the stress state in a circumferential direction in the air spring, wrinkling of the air spring wall is prevented and an air spring capable of a long and useful service life is obtained.

While a preferred form of the invention has been described, various modifications and changes will no doubt occur to those skilled in the art within the scope of the invention, the essential features of which are summarized in the appended claim.

What is claimed is:

A vulcanized, molded, single-convolution, unpressurized free bellows for a vehicle suspension system comprising in the as-molded condition, large and small coaxial end portions, respectively, and a flexible, inextensible wall portion connecting said end portions, said wall portion of said free bellows extending first as an outwardly convexly bulging convolution a substantial distance in a first axial direction from said large end portion, said wall then curving inwardly toward the axial centerline of said bellows and thereafter extending axially in a direction opposite said first axial direction a substantial distance beyond said large end portion, and terminating in said small end portion.

References Cited in the file of this patent

UNITED STATES PATENTS

| | | |
|---|---|---|
| 1,878,440 | Duffy | Sept. 20, 1932 |
| 2,509,143 | Getchell | May 23, 1950 |
| 2,775,983 | Johnson et al. | Jan. 1, 1957 |
| 2,901,242 | Elliott et al. | Aug. 25, 1959 |
| 2,950,104 | Bowser et al. | Aug. 23, 1960 |